Aug. 15, 1939. J. R. RINKS 2,169,926
GRADE CROSSING TRAFFIC CONTROL
Filed Dec. 29, 1937 4 Sheets-Sheet 2
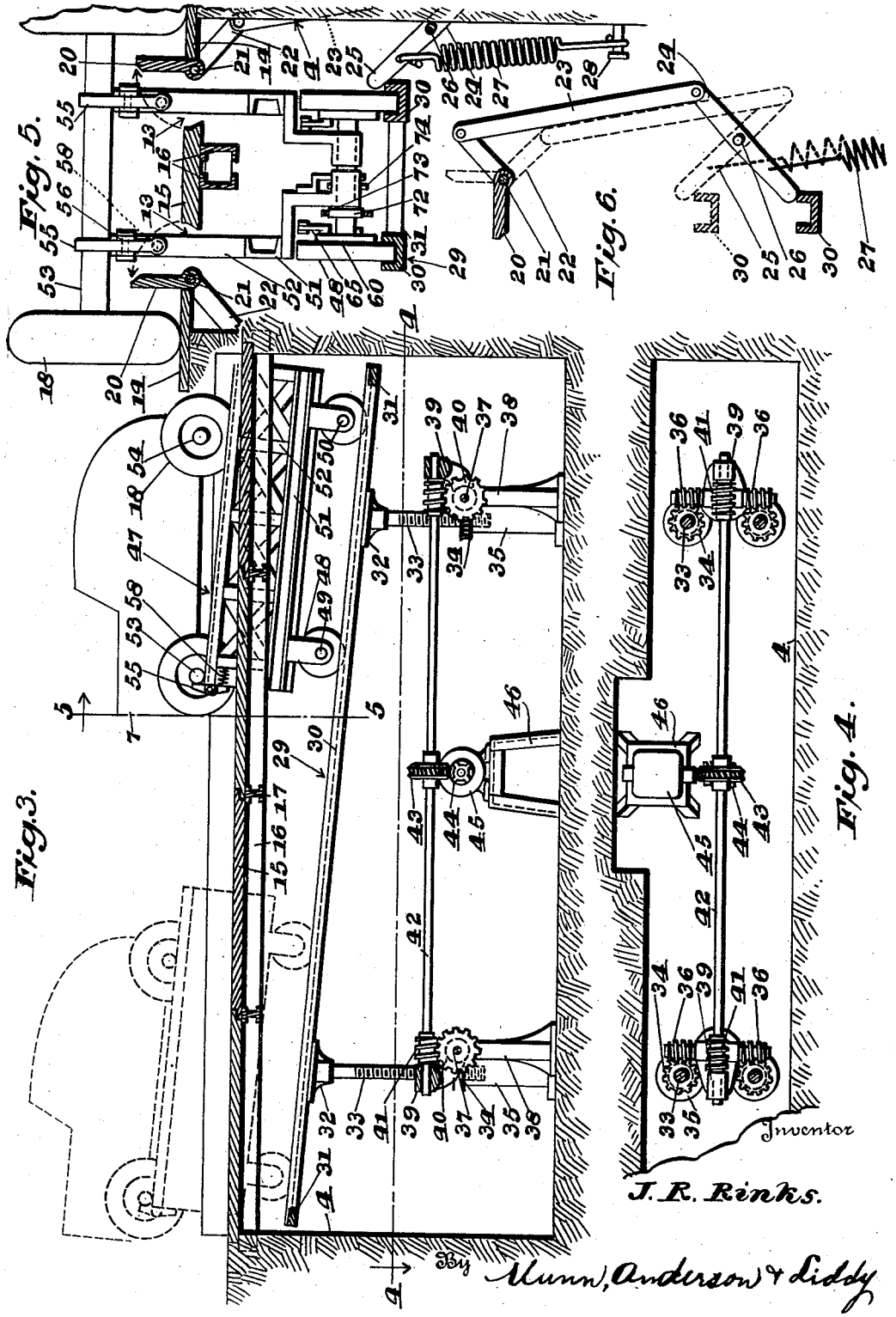
Inventor
J. R. Rinks.
By Munn, Anderson & Liddy

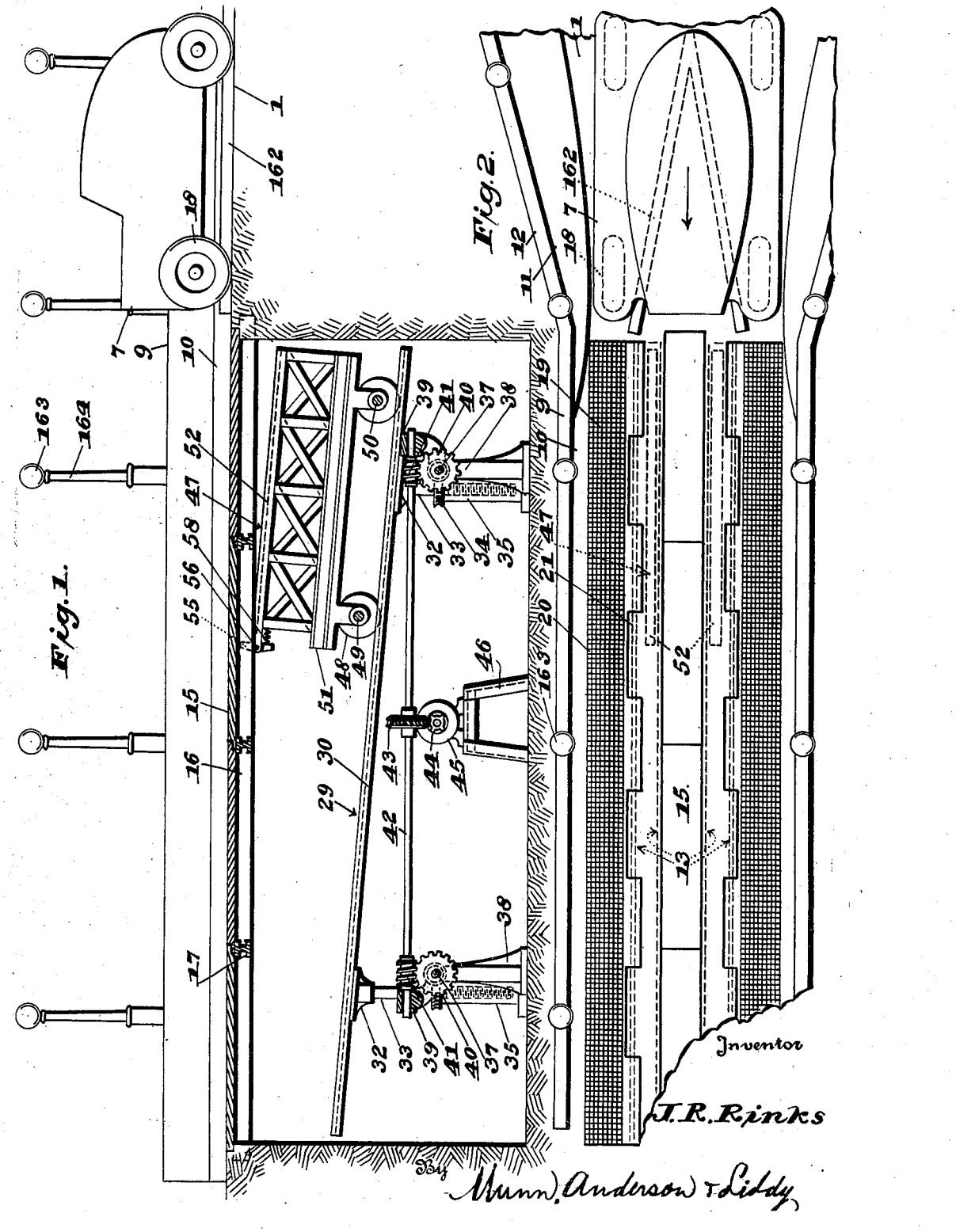

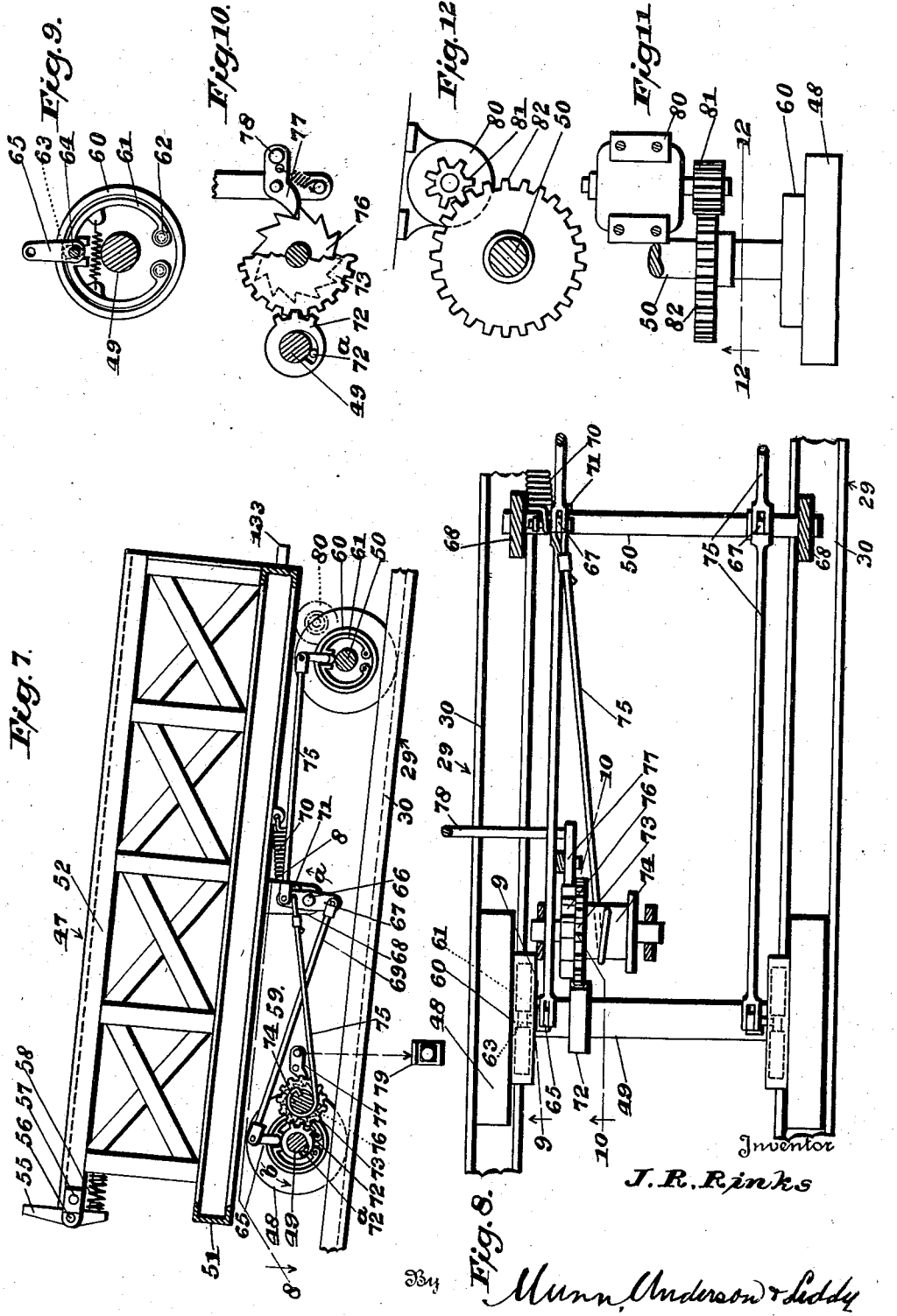

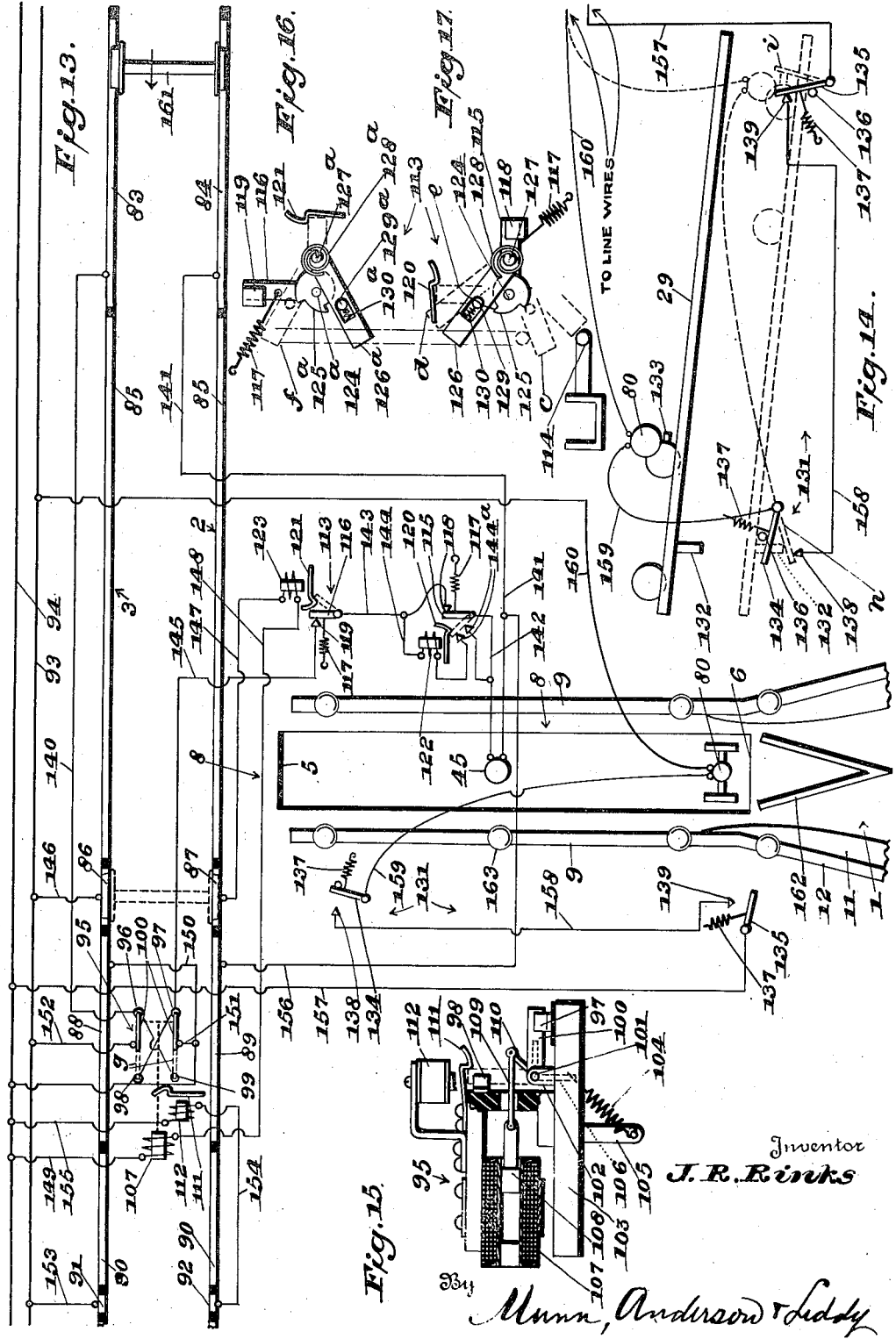

Patented Aug. 15, 1939

2,169,926

UNITED STATES PATENT OFFICE 2,169,926

GRADE CROSSING TRAFFIC CONTROL

James R. Rinks, Nashville, Tenn.

Application December 29, 1937, Serial No. 182,349

15 Claims. (Cl. 39—6)

This invention relates to improvements in traffic controlling devices. Its particular purpose is to so control vehicular traffic in the approaches to a railway grade crossing as to prevent an automotive or other vehicle from crossing the tracks in front of an on-coming train.

The need for such a control is given almost daily emphasis in the newspapers in their accounts of automobiles, busses and the like becoming struck and destroyed by fast moving trains because of the lack of adequate preventatives against such material demolition, together with the destruction of the lives of the occupants.

It is considered totally inadequate to stop at equipping grade crossings with visible and audible alarms. It is true that in most instances these are heeded by automobile drivers, but in many instances drivers do not pay any attention to signals with the results already set out. Consequently the objects of the invention are as follow:

First, to provide a traffic controlling device which is actuated by a railway train upon its approach to a crossing, to bodily lift an automobile or equivalent vehicle from the road in the event of said automobile having failed to stop and having come dangerously close to the rails, thereby preventing its crossing the track.

Second, to provide a traffic controlling device wherein a carrier which is normally housed below the road level is caused to rise to an engageable altitude in respect to an approaching automobile, the momentum of said automobile causing a braking action upon said carrier and automobile.

Third, to provide for the automatic return of the carrier after a forward run and subsequent lowering into the road pit, the automatic action being suspended, however, in the absence of a forward carrier run.

Other objects and advantages will appear in the following specification, reference being had to the accompanying drawings, in which:

Figure 1 is a partially sectional and elevational view illustrating the general arrangement of the invention.

Figure 2 is a plan view of the traffic control.

Figure 3 is a view similar to Fig. 1 illustrating the act of lifting an automobile from the road surface.

Figure 4 is a horizontal section taken on the line 4—4 of Fig. 3, mainly illustrating the worm jacks.

Figure 5 is a cross section taken on the line 5—5 of Fig. 3.

Figure 6 is a detailed diagrammatic view illustrating one of the automatic gate opening mechanisms.

Figure 7 is a partially sectional and elevational view of the carrier.

Figure 8 is a horizontal section taken on the line 8—8 of Fig. 7, mainly illustrating the automatic brake mechanism.

Figure 9 is a cross section taken on the line 9—9 of Fig. 8, and illustrating one of the brakes.

Figure 10 is a cross section taken on the line 10—10 of Fig. 8 and illustrating the ratchet release.

Figure 11 is a plan view of the motor drive of the carrier.

Figure 12 is a cross section taken on the line 12—12 of Fig. 11.

Figure 13 is a diagram of the electrical system.

Figure 14 is a diagram of the electrical system involving the automatic stopping of the carrier motor.

Figure 15 is a partially elevational and sectional view of the reversing switch.

Figure 16 is a diagrammatic view of the top switch for the elevator motor.

Figure 17 is a diagrammatic view of the bottom switch for the elevator motor.

In carrying out the invention, an arrangement generally as illustrated in Figs. 1 and 2 is built into the road 1 in its approach to the railway tracks 2, 3 (Fig. 13). This arrangement is typical of any grade crossing and is to be repeated in every road construction near the railway tracks, and on both sides of the latter, whether the railway is a single track system (Fig. 13) or comprises multiple tracks.

A pit 4 (Fig. 1) is dug in the rod 1 from the point 5 (Fig. 13) to a point 6 approximately 100 feet back. This dimension is merely suggestive and will be varied according to individual requirements. This distance is ordinarily sufficient to enable the stopping of the automobile 7, said stopping being accomplished by lifting the automobile from the road surface and quickly but gradually and firmly arresting its momentum.

The sides of the protected area 8, which the zone occupied by the pit may well be called, is walled at 9 and the wall is supplemented with low curbs 10 which are in broadened and rounded relationship at 11 with the flaring entrances 12 of the walls 9. The purpose of this structure is to define a constricted opening which will insure the centralization of the automobile 7 over and longitudinally of the pit 4.

The latter has longitudinal top openings 13 (Fig. 5) which are defined by the inner edges of a pair of cover plates 14 and a central sectional cover 15. The cover plates 14 extend inwardly of the side walls of the pit 4 (Fig. 5) to such a distance as will fix the width of the openings 13 at the least possible dimension sufficient for the projection of the elevator to its operative and vehicle-receiving position. The fixing of this distance necessarily requires making the central cover 15 the proper width. The sections of this cover can be taken up in order to have access to the pit 4. They are supported by strong longitudinal channels 16 and a sufficient number of cross beams 17.

As shown in Fig. 5 the wheels 18 of the automobile 7 whether the latter comprises a passenger vehicle, truck, etc. run upon the cover plates 14. These are desirably roughened at 19 (Fig. 2). The openings 13 are normally closed by gates 20 and since both gates are identical in construction the description of one will suffice.

The gate 20, making reference to the one at the right, (Figs. 5 and 6), is connected to the cover plate 14 by a hinge pin 21. At some appropriate place this hinge pin has an arm 22 rigidly connected to it. A link 23 connects the free end of this arm with a matching arm 24 which comprises a continuation of the lever 25 on the right side of the pivot 26. This pivot is suitably supported on the inner wall of the pit 4. A heavy spring 27 is anchored to the same wall at 28, the other end of the spring being connected to the lever 25. The raising of the elevator turns the lever-arm 25, 24 clockwise (Fig. 6) thereby to automatically raise the gate 20. As the elevator later lowers, the spring 27 automatically closes the gate. The opening and closing mechanism shown at the right side of Figs. 5 and 6 is in practice duplicated on the left side.

Reference is now made to the elevator which is responsible for the foregoing action. This elevator is generally designated 29. It comprises a pair of channels 30 which constitute tracks (Figs. 3 and 5). In practice these tracks are laterally braced as suggested at 31 (Fig. 5) so as to hold them in perfectly rigid parallelism. Said tracks are disposed on a permanent incline sloping upwards from right to left, as shown. This incline is preserved by the manner of attaching them to the four pads 32 on the upper ends of as many jack screws 33. There are four of these screws (Fig. 4) and each one is threaded through a worm gear 34 which is swivelly mounted upon a rigid jack stand 35.

Said worm gears have worm pinions 36 in mesh therewith (Fig. 4), these pinions being connected in pairs on each of two cross shafts 37. Each cross shaft is carried by a bearing 38 which has an upward extension terminating in a journal 39. The cross shaft 37 has a central worm gear 40 with which a worm pinion 41 meshes. A drive shaft 42 carries a worm pinion 41 near each end. The ends of the shaft are supported by the journals 39. The drive shaft has a worm gear 43 with which the drive pinion 44 on the shaft of the elevator motor 45 meshes. This motor is supported on a stand 46 on the bottom of the pit 4.

The structure just described is that of the worm jacks which raise and lower the elevator 29. The circuit for the motor 45 and the manner of its control are described in connection with Fig. 13. This motor is reversible, that is to say, when it is driven to revolve its shaft in one direction, the worm jacks are caused to raise the elevator. When the motor is reversed to revolve its shaft in the opposite direction, the worm jacks cause lowering of the elevator.

This elevator supports a carrier which is generally designated 47. The carrier is a wheeled car, the wheels 48 of which run in the tracks 30. The wheels are connected in pairs by axles 49, 50, and the axles are supported in journals (Fig. 5) in any suitable manner beneath the chassis 51.

This chassis has a pair of narrow, longitudinal upstanding frames 52 (Fig. 5). The reason for their being narrow is that they must project up through the openings 13 in positions to be contactable by the front and rear axles 53, 54 of the automobile 7. Normally the carrier 47 stands at the bottom of the incline (Fig. 1) with none of its parts showing. The gates 20 are then closed. The raising of the elevator 29 projects the frames 52 slightly above the road surface. An advancing automobile 7 is adapted to be caught by the carrier and this is accomplished by a pair of stops 55 on the high end of the carrier.

Each stop is pivotally carried at 56 by a strap arrangement 57 that is riveted to the respective frame. A heavy coil spring 58 absorbs the shock of the impact of the axle 53 with the respective stop 55. This spring is set in position between the lower end of the stop 55 and an adjacent part of the frame. While the spring 58 will yield under the initial impact it will not yield enough to make the stop 55 collapse. Consequently the forward momentum on the automobile will maintain a push against the stops, causing the carrier 47 to ride up out of the pit until it reaches the top of the incline (dotted lines, Fig. 3). As this is done the automobile is gradually lifted from the road surface, and an automatic brake mechanism, embodied in the carrier, is brought into play.

The automatic brake mechanism is generally designated 59 (Figs. 7 and 8). Its construction is as follows: Each wheel carries a brake drum 60 (Fig. 9). Internally expanding shoes 61 are pivoted at 62 to some appropriate support (not shown). These shoes are separated by a cam 63 that is carried by the shaft 64 of a lever 65. This structure occurs at each one of the wheels.

A central jack shaft 66 (Fig. 7) has oppositely directed arms 67 near each of its ends where it is carried by pendent supports 68, and these arms are connected by links 69 to the various levers 65 in such a manner that a counterclockwise turn of the jack shaft (arrow a) will apply all of the brakes. At that time when the brakes are released a spring 70 turns the jack shaft 66 clockwise until one of its arms 67 engages a fixed stop 71.

Provision is made for a gradual application of the brakes 60, 61 as the carrier 47 travels up the inclined tracks 30 under the momentum of the automobile 7. With each revolution of one of the carrier axles, for example the axle 49, the teeth of a mutilated gear 72, loosely carried by the axle, mesh with the teeth of a complete gear 73 on one end of a winch 74 to impart a turn. A slip clutch 72a (Figs. 7 and 10) secures the mutilated gear to the axle 49 during the upward travel of the carrier, but releases the mutilated gear on the downward travel. The winch has one end of a cable 75 fastened to it. The other end of the cable is fastened to one of the arms 67. Inasmuch as the turning of the wheels 48 is counterclockwise (arrow b, Fig. 7) when the carrier travels up hill, the resulting turn of the winch 74 will be clockwise. The cable 75 will be tightened slightly every time the mutilated gear 72 goes around, thereby moving the jack shaft 66 counterclockwise and gradually applying all of the brakes.

The extent of upward travel of the carrier 47 is capable of sufficiently exact determination to insure the disengaged status of the mutilated gear 72 from the full gear 73 when the brakes are fully applied and the carrier stops at the top of the incline. The gear 72, therefore, does not offer an impediment to the release of the brakes when the elevator is lowered as presently described.

A ratchet 76 and dog 77 hold the winch 74 at the end of every turn so as to maintain the increased tightening of the cable 75. This dog is automatically released when the elevator 29 is lowered and when it is almost at the bottom of the lowering operation. This is accomplished by the engagement of a pin 78 extending laterally from the dog 77 (Fig. 8), with a fixed stop 79 on the wall of the pit (Fig. 7). This releases the brakes but dependence is not put upon the inclination of the tracks 30 for the return of the carrier.

The carrier is returned by the operation of a motor 80 (Figs. 11 and 12) which has a pinion 81 in mesh with a gear 82 on one of the axles. The motor is secured to the chassis 51 and it is operated by current in a circuit which is automatically controlled by the elevator 29. This and other circuits involved are illustrated in Figs. 13 and 14 to which attention is now directed.

The railway tracks 2, 3 are insulated from each other for given distances toward each side of the protected area 8. The insulating inserts separate the tracks into sections 83, 84; 85; 86, 87; 88, 89; 90; and 91, 92. Current is supplied to the electrical system from any desired source, the line wires 93, 94 being a convenient illustration of one source of current, it being understood that these wires are connected to a generator or its equivalent.

A reversing switch, generally designated 95 (Fig. 15) is located in the vicinity of the track section 88, 89. This switch has duplicate sets of contacts 96, 97 and 98, 99. The double blades 100 are rigidly connected to a shaft 101 which is supported in bearings 102 upon a suitable base 103. A spring 104 anchored at one end to an arm 105 on the base and at the other end to a pin 106 on the shaft 101, tends to keep the blades 100 down and in engagement with the contacts 96, 97.

A solenoid 107 reverses the switch when energized. For this purpose its movable plunger 108 has a link connection 109 with an arm 110 on the shaft 101. When the blades 100 are thus engaged with the contacts 98, 99, they are held there against the tension of the spring 104 by a spring latch 111. An electro-magnet 112 is adapted to attract the latch 111 when energized, thereby to release the blades 100 and enable the spring 104 to restore the switch to its starting position, (Figs. 13 and 15).

Provision is made of a switch arrangement 113 (Fig. 13) of the "lazy man" type for the automatic control of the elevator 29. For the purpose of this control one of the tracks 30 of the elevator has a pin 114 projecting from it (Fig. 17). Said arrangement comprises bottom and top switches 115, 116. Springs 117 tend to keep the switches pulled against the respective fixed contacts 118, 119. Spring latches 120, 121 hold the respective switches in their open positions when moved thereinto by the pin 114. Electro-magnets 122, 123 are adapted to be energized and attract the respective latches so that one or the other of the two springs 117 can pull the switches back against their contacts.

The mechanism of each of the switches 115, 116 is the same, the only difference lying in slight changes in the location of some of the parts. Respecting the bottom switch 115, the shaft 124 of the switch blade is journalled upon suitable bearings (not shown). This shaft carries a ratchet 125 which is fixed to it. An actuating arm 126 has its shaft 127 journalled in bearings (not shown) a slight distance away from the shaft of the ratchet. A spring 128 is so anchored at one end and attached to the arm 126 at the other end as to tend to keep the latter in the full line position in Fig. 17. The arm is adapted to be swung into both positions $c$ and $d$ during the downward and upward movements of the elevator 29, but always springs back to the full line normal position when the pin 114 passes.

A ratchet pin 129 is held in the ratchet-engaging position by a spring 130. The pin and spring are carried by the arm 126. The arc $e$ of motion of the pin 129 is flatter than the circumferential configuration of the ratchet 125 because of the offsetting of the shafts 124 and 127. Consequently the pin 129 disengages the ratchet at the extremities of motion of the arm 126. Inasmuch as these details are the same for the switch 116, as were just described in connection with the switch 115, the same numerals are used for corresponding parts, but are distinguished by the exponent letters $a$ and without further description.

A duplex switch arrangement 131 is used for the automatic control of the carrier motor 80 (Figs. 13 and 14). This control involves the use of a stud 132 which is pendent from the elevator 29 and a stud 133 which projects from the carrier chassis 51. A switch 134 is subject to operation by the stud 132. A switch 135 is subject to operation by the stud 133. Each switch is adapted to be pulled against a fixed stop 136 by a spring 137. When the switch 134 is thus pulled it disengages a contact 138 while when the contact 135 is thus pulled it engages a contact 139.

The wiring connecting the various electrical devices comprises the following: a wire 140 connects the section 83 to the contact 96. A wire 141 connects the section 84 to one terminal of the elevator motor 45. The other terminal of this motor is connected to the switch 115 by a wire 142. The contact 118 of that switch is connected to the switch 116 by a wire 143. The magnet 122 is situated in the wire 144 connected between wires 142 and 143 and constituting a shunt circuit. Said wire 144 is separated at a pair of contacts 144a which are controlled by the switch 115. A wire 145 connects the contact 119 to the contact 97.

A wire 146 connects the section 86 to the line wire 93. A wire 147 connects the section 87 to one terminal of the magnet 123, the other terminal being connected by a wire 148 to one terminal of the solenoid 107. The other terminal of said solenoid is connected by a wire 149 to the line wire 94.

A wire 150 connects the section 88 to the line wire 94, a short branch 151 extending to one of the blades of the reversing switch. A wire 152 connects the other blade to the line wire 93. A wire 153 connects the section 91 to the line wire 93. A wire 154 connects the section 92 to one terminal of the magnet 112, the other terminal being connected to the line wire 94 by a wire 155.

A wire 156 connects the track section 89 to the wire 141. This is the same in effect as though the wire 156 were connected directly to the adjacent terminal of the motor 45. A wire 157 connects the line wire 94 to the switch 135. A wire 158 connects the contact 139 of that switch with the contact 138. A wire 159 connects the switch 134 to one terminal of the carrier motor 80, the other terminal of that motor being connected by a wire 160 to the line wire 93. The wires 159, 160 are necessarily loose, that is to say, they must have a loop in them so as to accommodate the travel of the carrier 47 along the elevator 29.

The operation is as follows, reference being made to Fig. 13. An approaching train is here indicated 161. The previously mentioned curb in 10, 11 (Fig. 2) is supplemented by a centralized guard 162 of V-formation, this and the broadened parts 11 of the curbing insuring that the automobile 7 (Fig. 2) will be guided directly onto the roadway control. From this it will be understood that an automobile is approaching the grade crossing simultaneously with the train 161.

When the train bridges the rail sections 83, 84, current flows as follows: from line wire 93, wire 152, switch blade 100 and contact 96, wire 140 to section 83, through the train axle to section 84, wire 141 to elevator motor 45, from elevator motor 45 over wires 142, 144 and magnet 122, wire 143, switch 116, wire 145, contact 97, switch blade 100, wire 151 back to line wire 94. The energization of magnet 122 attracts the latch 120 and releases the switch 115. The spring 117 pulls the switch against the contact 118 so that the motor current traverses this path because of the shunt path 144 having been opened at the contacts 144a.

The elevator motor 45 is now in operation and raises the elevator 29 from the position in Fig. 1 to the position in Fig. 3 by means of the worm jacks. The foregoing circuit closure occurs immediately upon entrance of the train into track section 83, 84. Since this section is commonly of considerable length, the period of its traversal by the train, and the consequent maintenance of the circuit closure, affords more than sufficient time for the elevator 29 to reach its initial elevation in the pit 4 (full lines, Fig. 3). At that time the motor (45) circuit is open, being opened in the manner presently stated, while the train eventually passes forwardly out of section 83, 84. As the elevator rises, its pin 114 merely displaces the actuating arm 126 to the position d. As the elevator near the top of its motion said pin encounters the arm 126a and moves it to the approximate position f (Fig. 16). The resulting turn of the ratchet 125a disengages the switch 116 from the contact 119, opening the elevator motor circuit and causing said switch to be caught by the latch 121. The elevator 29 is thus stopped in the raised position and it is prevented from lowering of its own accord because of the nature of the intermeshed worm gearing which actuates it.

At this point the carrier 47 stands in the partly projected position with reference to the road surface shown in Fig. 3. The gates 20 were automatically opened by the gate-opening mechanism (Figs. 5 and 6) as the elevator 29 was raised. On the previous assumption that the automobile 7 is approaching the grade crossing, its front axle 53 will strike the stops 55 and drive the carrier 47 forwardly toward the railway tracks under the momentum of the automobile. Inasmuch as the elevator tracks 30 are set on an upward slant, it follows that the automobile will be lifted clear of the road surface by the time the carrier 47 has completed its journey (dotted lines Fig. 3).

During this period the automatic brake mechanism (Figs. 7 and 8) was set in operation to slow down and eventually stop both the carrier 47 and the automobile 7. This mechanism works on a step motion because of the mutilated gear 72, every engagement of its teeth with the gear 73 of the winch 74 causing an additional tightening of the brake shoes 61.

The track sections 85 are clear, so to speak, nothing happening in the control mechanism while these are traversed by the train 161. However, when the latter reaches the sections 86, 87, these sections being located an appropriate distance down the tracks toward the left of the roadway, current is directed through the elevator motor 45 in a direction reverse to the initial flow. This causes the motor 45 to reversely operate the worm jacks (Figs. 3 and 4) thereby again lowering the elevator 29. The current flow then traverses the following circuit: from line wire 93 to section 86, through the axle of the train to section 87, wire 147, magnet 123, wire 148, solenoid 107 and wire 149 back to line wire 94.

The resulting energization of magnet 123 attracts the latch 121 enabling the spring 117 to pull the switch 116 into engagement with the contact 119. The energization of the solenoid 107 swings the blades 100 (dotted lines, g Fig. 13) over into engagement with contacts 98, 99. The switch 116 and the reversing switch 95 thus stand reversed in readiness for the entrance of the train upon sections 88, 89. When that occurs current flows through the following circuit: from line wire 93, wire 152, blade 100, contact 98 to contact 97, wire 145, contact 119, switch 116, wire 143, contact and switch 118, 115, wire 142, motor 45, wires 141, 156 to section 89, through the train axle to section 88, thence over wire 150 back to line wire 94.

When the elevator approaches the bottom of its descent it is automatically stopped by the engagement of the pin 114 with the actuating arm 126 (Fig. 17). The approximately one-quarter turn given the arm 126 when the pin reaches the position c disengages the switch 115 from contact 118 and emplaces it behind the latch 120. By this time the train will have left sections 88, 89 so that there will be no current left in the circuit to energize magnet 122 to attract the latch 120 and prevent the catching of the switch 115.

It is recognized that the functioning of the switch 115 and motor 45 for the purpose of restoring the elevator 29 to its bottom position requires a fairly exact timing insofar as occupancy of the sections 88, 89 by the train is concerned, but this problem does not present an insuperable difficulty because the sections 88, 89 can either be cut in size to accommodate trains of average length or the circuit 152, 145, 156, 150 may be provided with a known supplemental control for the motor 45. This will cause the operation of the motor 45 to work out properly, and avoid the residual energization of the magnet 122 as previously suggested.

The magnetizing shunt circuit 144 was broken at the contacts 144a as soon as the switch 115 made contact at 118, and it remained open until the elevator returned to the bottom by which time the train has departed from sections 88, 89, as previously stated.

As the elevator nears the bottom of its descent, it causes the automatic release of the brake mechanism 59. The pin 78 engages the stop 79 (Fig. 7). The dog 77 is disengaged from the ratchet 76. The spring 70 thereupon loosens the setting means for the brakes preparatory to the return trip of the carrier 47. The return trip of the carrier is unimpeded by the gears 72, 73, because of the release at the slip clutch 72a.

Simultaneously with the foregoing opening of the elevator motor circuit the descending elevator 29 causes the automatic starting of the carrier motor 80, whereupon the carrier 47 is transported back to its starting position at the bottom of the incline. The engagement of the stud 132 (Fig. 14) with the switch 134 moves the latter to the dotted line position h thus closing the following circuit: current flows from line wire 93 over wire 160 to the motor 80, wire 159 to switch 134 (Fig. 14), contact 138 over wire 158 to contact 139, switch 135, and wire 157 back to line wire 94.

As soon as the carrier 47 nears the bottom of the incline its stud 133 shifts the switch 135 to the dotted line position i (Fig. 14) thereby opening the circuit through the carrier motor 80. The switch 135 is held open as long as the carrier stays at the bottom of the incline. The affect of this provision is this: every approach of a train 161 will cause the elevator 29 and carrier 47 to be raised to the position in Fig. 3. But if there happens not to be any approaching automobile 7 to engage the carrier 47 the latter will not be propelled forwardly. It merely stays in the one position. The elevator 29 is later lowered in the manner already described. But when the elevator is raised the switch 134 (Fig. 14) is caused to break engagement with the contact 138 thereby preventing the operation of the motor 80 should the carrier 47 be propelled through a forward trip, it being noted that in this act the switch 135 automatically closes.

The final act of the train occurs when the track sections 91, 92 (Fig. 13) are bridged. Current then flows from line wire 93, wire 153 to section 91 through the train axle to section 92, wire 154, magnet 112 and wire 155 back to line wire 94. The energization of the magnet 112 attracts the latch 111, permitting the spring 104 (Fig. 15) to return the blades of the reversing switch 95 to their initial and normal positions.

In conclusion it is desired to point out that lamps 163 (Figs. 1, 2 and 3) are used to advantage. These lamps are mounted on posts 164 along walls 9. These are intended to be lighted especially at night and if it is so desired, the pair of lamps nearest the tracks 2, 3 can be left dark until the train 161 enters the sections 83, 84, whereupon an ordinary lighting circuit can be closed to light these lamps, thus increasing the illumination of the protected area 8.

It is desired to point out that the gates 20 (Figs. 2 and 5) have as their principal purpose to cover the pit openings 13 and to shield the elevator and carrier mechanisms in the pit so as to prevent snow and ice from entering to do possible damage to the electrical parts. While on the subject of the carrier 47, it is also desired to state that the wheels 48 will be journalled upon roller bearings so as to make the carrier easily movable when impacted by a vehicle making an attempt to cross the railway tracks.

I claim:

1. A traffic control comprising a carrier, an elevator supporting the carrier in a position normally below the level of a road which is traversible by a vehicle, means by which to raise the elevator so as to project a portion of the carrier into the path of the vehicle whereby the momentum of the vehicle will propel the carrier along the elevator, and brake mechanism embodied in the carrier, being progressively applied by the motion of the carrier to stop the vehicle.

2. A traffic control comprising a carrier, an elevator including tracks upon which the carrier is supported in a position normally below the level of a road which is traversible by a vehicle, means by which to raise the elevator so as to project a portion of the carrier into the path of the vehicle whereby the momentum of the vehicle will propel the carrier along the tracks, and a brake mechanism embodied in the carrier which is set with increasing tightness by the motion of the carrier to slow down and stop both the carrier and vehicle.

3. A traffic control comprising a carrier, an elevator including inclined tracks which support the carrier at the bottom of the incline in a position normally below the level of a road which is traversible by a vehicle, and means by which to raise the elevator so as to project a portion of the carrier into the path of the vehicle, whereby the momentum of the vehicle will propel the carrier up the incline and lift the vehicle off of the road.

4. A traffic control comprising a carrier, an elevator including inclined tracks supporting the carrier at the bottom of the incline in a position normally below the level of a road which is traversible by a vehicle, stop means at the high end of the inclined carrier, and means by which to raise the elevator so as to project the stop means and a portion of the carrier above the road level and into the path of the vehicle, the latter being adapted to straddle said portion of the carrier and engage the stop means thereby to propel the carrier upwards along the tracks, said carrier portion engaging the vehicle axles and lifting the vehicle from the road.

5. A traffic control comprising a carrier which has wheels, a brake for at least one of the wheels, setting means by which to apply the brake, an elevator including inclined tracks supporting the carrier and its wheels at the bottom of the incline in a position normally below the level of a road which is traversible by a vehicle, means by which to raise the elevator so as to project a portion of the carrier into the path of a vehicle for engagement thereby to cause the momentum of the vehicle to propel the carrier wheels along the tracks, and means which is actuated by a carrier wheel to operate the setting means with a step motion, thereby to progressively apply the brake as the carrier and vehicle travel up the incline.

6. A traffic control comprising a wheeled carrier to transport a vehicle which is adapted to be stopped, a brake drum on at least one of the wheels, brake shoes and actuating means therefor, setting means to pull on the actuating means and thereby tighten the shoes against the drum, said setting means including a winch with a gear, a mutilated gear on one of the wheel axles periodically engaging the gear and giving the winch a turn to successively pull the setting means and progressively tighten the brake, and means to hold the winch at every turn.

7. A traffic control comprising a wheeled carrier, a brake mechanism for at least one of the wheels, an elevator supporting the carrier in a position normally below the level of a road which is traversible by a vehicle, means by which to raise the elevator so as to project a portion of the carrier into the path of the vehicle whereby the carrier is propelled along the elevator by the momentum of the vehicle, driving means for returning the carrier to its starting point on the elevator, means operated by the forward motion of the carrier to gradually apply the brake mechanism thereby to bring the carrier and vehicle to a stop, and means to automatically disengage the brake mechanism preparatory to its backward motion by the driving means.

8. In a traffic control, a carrier having an axle with a wheel and a brake drum, a brake shoe for the drum, setting means for the shoe including a winch having a cable for actuating the shoe to set the brake, a gear on the winch, and a meshable mutilated gear loose on the axle, a one-way clutch between the axle and mutilated gear positively driving the mutilated gear to periodically turn the winch member one direction of travel of the carrier, and means to hold the winch at each turn to maintain the increasing tension of the cable.

9. A traffic control comprising a carrier, an elevator supporting the carrier in a position normally below the level of a road in proximity to where it crosses the rails of a railway, means operable to raise the elevator so as to project a portion of the carrier into the path of a vehicle traversing the road toward the rails, brake mechanism embodied in the carrier and operated by the motion of the carrier along the elevator due to the momentum of the vehicle, means operable to again lower the elevator and free the vehicle from the carrier, and means then actuated by the elevator to return the carrier to its starting position.

10. A traffic control comprising a carrier, an inclined elevator supporting the carrier at the low end in a position normally below the level of a road in proximity to where it crosses the rails of a railway, means operable to raise the elevator and project a portion of the carrier into the path of an advancing vehicle on the road, brake mechanism embodied in the carrier and operated by the motion of the carrier up the incline of the elevator due to the momentum of the vehicle after its impact and engagement by the vehicle, the riding of the carrier up the incline raising the vehicle off of the road, means operable to lower the elevator and set the vehicle upon the road, and means then actuated by the elevator to return the carrier to the low end of the elevator.

11. A traffic control comprising a carrier, an inclined elevator supporting the carrier on its low end in a position normally below the level of a road and in a pit in proximity to where it crosses the rails of a railway, motor driven jacks for operating the elevator, an electrical circuit containing the jack motor and which is adapted to be closed, said circuit including a reversing switch, and its closure raising the elevator to project the carrier above the road level to intercept an advancing vehicle, brake mechanism embodied in the carrier and operated by the motion of the carrier due to the impulse of the vehicle up the elevator, said vehicle engaging the carrier and being lifted thereby off of the road, an electrical circuit adapted to be closed subsequently to the closure of the previously stated circuit, and having means therein producing a reversal of the reversing switch, and another electrical circuit adapted to be finally closed through the jack motor and the reversed switch, to reversely operate said motor for lowering the elevator and again depositing the vehicle on the road.

12. In a traffic control, an elevator situated in a pit in a road, said elevator comprising parallel tracks having pendent jack screws of different lengths which set the tracks on an incline, jack stands for the screws having swivelled worm gears to operate the screws, an intermeshed arrangement of the worm gears and pinions terminating at said worm gears and including a drive shaft, a motor for driving said shaft, and a wheeled carrier having its wheels resting upon the tracks and adapted to be raised and lowered in reference to the road level by the operation of the motor.

13. In a traffic control, a carrier, an elevator supporting the carrier in a pit normally below the level of a road containing the pit, gates at the approximate road level and closing portions of the pit, means for raising the elevator thus to project portions of the carrier above the road surface, and means actuated by the elevator to raise the gates and clear the way for the carrier.

14. In a traffic control, a carrier including parallel frames, an elevator supporting the carrier in a pit normally below the level of a road containing the pit, a central cover situated over the pit and defining longitudinal openings with the sides of the pit, gates normally closing said openings, means by which to raise the elevator, thereby to project the carrier frames through the openings into positions of impact by an approaching vehicle, and a linkage actuated by the rising elevator to open the gates in advance of the carrier and let the frames through the openings.

15. In a traffic control, a carrier, an elevator supporting the carrier in a pit normally below the level of a road containing said pit, means by which to raise the elevator and thus project the carrier for interception by an approaching vehicle, and guard means on the road to centralize the vehicle over the carrier, said guard means comprising walls narrowing toward the pit, curbing at the bottom of the walls and a central V-shaped guard in advance of the pit.

JAMES R. RINKS.